(12) United States Patent
Farrell

(10) Patent No.: US 8,136,485 B2
(45) Date of Patent: Mar. 20, 2012

(54) FLUE, AND A BOILER INCLUDING SUCH A FLUE

(75) Inventor: Christopher C. Farrell, Plymouth (GB)

(73) Assignee: Zenex Technologies Limited, Exeter (GB)

( * ) Notice: Subject to any disclaimer, the term of this patent is extended or adjusted under 35 U.S.C. 154(b) by 895 days.

(21) Appl. No.: 11/992,617

(22) PCT Filed: Aug. 11, 2006

(86) PCT No.: PCT/GB2006/003003
§ 371 (c)(1),
(2), (4) Date: Mar. 26, 2008

(87) PCT Pub. No.: WO2007/036684
PCT Pub. Date: Apr. 5, 2007

(65) Prior Publication Data
US 2009/0272340 A1    Nov. 5, 2009

(30) Foreign Application Priority Data

Sep. 27, 2005    (GB) .................................... 0519704.1

(51) Int. Cl.
*F22B 7/18* (2006.01)
(52) U.S. Cl. ..................................... 122/152; 122/135.1
(58) Field of Classification Search ................. 122/13.1, 122/15.1, 152, 135.1–187, 13.01; 432/219; 126/319
See application file for complete search history.

(56) References Cited

U.S. PATENT DOCUMENTS

| | | | | |
|---|---|---|---|---|
| 4,676,199 A | * | 6/1987 | Daugirda et al. | 122/13.01 |
| RE33,082 E | * | 10/1989 | Gerstmann et al. | 122/20 B |
| 5,697,330 A | * | 12/1997 | Yetman et al. | 122/14.21 |
| 7,100,541 B2 | * | 9/2006 | Frasure et al. | 122/159 |
| 2002/0166587 A1 | | 11/2002 | Weaver | |

FOREIGN PATENT DOCUMENTS

| | | |
|---|---|---|
| DE | 3442990 | 5/1986 |
| DE | 8802425 | 5/1988 |
| DE | 91 14 469 U1 | 2/1992 |
| DE | 43 12 094 A1 | 10/1993 |
| DE | 195 18 076 A1 | 11/1996 |
| DE | 196 06 403 A1 | 8/1997 |
| DE | 29710273 | 9/1997 |
| EP | 0 507 167 A2 | 10/1992 |
| EP | 1 136 757 A2 | 9/2001 |
| EP | 1245902 | 10/2002 |
| EP | 1650501 | 4/2006 |
| GB | 2116299 A * | 9/1983 |
| GB | 2149484 | 6/1985 |
| GB | 2 368 632 A | 5/2002 |
| GB | 2415033 | 12/2005 |
| JP | 09229346 A | 9/1997 |
| WO | WO 2006/059215 A1 | 6/2006 |

OTHER PUBLICATIONS

United Kingdom Search Report from United Kingdom Application No. GB0519704.1 dated Dec. 20, 2005.
United Kingdom Examination Report from United Kingdom Application No. GB0519704.1 dated May 24, 2007.

* cited by examiner

*Primary Examiner* — Gregory A Wilson
(74) *Attorney, Agent, or Firm* — Wolf, Greenfield & Sacks, P.C.

(57) ABSTRACT

A flue offering reduced pluming is provided, the flue comprising a flue pipe for carrying flue gas and a liquid collector adapted to collect condensation from the interior of the flue pipe and to shield it from the flue gas.

27 Claims, 2 Drawing Sheets

FLUE, AND A BOILER INCLUDING SUCH A FLUE

FIELD OF THE INVENTION

The present invention relates to a flue, and more particularly although not exclusively to a flue for a domestic gas boiler.

BACKGROUND OF THE INVENTION

Domestic dwellings are frequently fitted with balanced flue condensing gas boiler systems. In such an arrangement it is common for the boiler to be fitted on the interior face of an external wall of the building and a relatively short flue to be passed through the wall so as to vent outside. As a result, the flue tends to vent quite near to the ground, and often just at or slightly above head height.

A condensing boiler deliberately seeks to keep its flue gas temperature as low as reasonably possible. The flue gas naturally has to be warmer than the maximum water temperature required of the boiler, but any unnecessary increase above that results in heat being lost to the atmosphere and hence the efficiency of the boiler being reduced. Typically a condensing a boiler providing domestic heating can operate in its condensing mode and maintain a flue gas temperature below 58° C. However when operating in a hot water mode the boiler must seek to maintain its target temperature rise and flow rate and this causes the boiler to work in a less efficient regime where the flue gas temperature exceeds 58° C. and may reach 75° C.

A disadvantage of this move to lower flue gas temperatures is that the moisture within the flue gas formed as a by-product of the combustion process is far more likely to condense in the vicinity of the flue outlet. This can often be observed on windless days as the formation of a white cloud or plume around the flue vent. The formation of this plume is visually unattractive, especially in high density housing where several individual heating systems may vent in close proximity within, for example, a shared courtyard environment. Furthermore, as the moisture tends to concentrate other combustion products, such as acids, the formation of such low level plumes is undesirable from a public health stand point.

SUMMARY OF THE INVENTION

According to a first aspect of the present invention there is provided a flue, comprising flue pipe for carrying flue gas, and an elongate liquid collector within the flue pipe and adapted to collect condensation from the interior of the flue pipe and to shield it from the flue gas, and a liquid guide disposed within the flue pipe for directing droplets of moisture to flow towards the liquid collector.

It is thus possible to provide a modified flue in which condensate from the flue gas can be collected as the flue gas passes through the flue, and the condensate is then moved out of the path of the warm flue gas thereby inhibiting re-evaporation of the condensate back into the hot flue gas stream. This significantly reduces the amount of moisture contained within the flue gas as it exits the flue. This, in turn, reduces the instance and/or severity of pluming.

Advantageously the flue pipe is cooled in order to enhance condensation. This is easily and conveniently achieved for a balanced flue boiler by placing the flue pipe within a fresh air inlet pipe such that, as a boiler fan draws fresh air into the boiler in order to promote the combustion process, the inrush of cool air from outside passes over the exterior surface of the flue pipe thereby cooling it.

Advantageously gas flow director means are provided in order to urge the hot flue gas to flow adjacent the wall of the flue pipe thereby encouraging it to give up thermal energy and the moisture contained therein to condense.

Advantageously the flow director means imparts rotational motion into the gas such that droplets of condensate are thrown towards the flue walls where they are collected.

Advantageously the interior surface of the flue is coated with a material that does not wet. A suitable material is PTFE.

One or more guides are formed in the vicinity of, or extend from, the flue walls in order to guide any moisture collecting on the walls towards the liquid collector. The guides may advantageously extend along the flue in helical manner with the pitch of the helix substantially matched to an average gas flow rate through the flue and the rotational rate imparted by the flow director such that the guides continue to urge the gas to maintain its rotational motion. The guide may be integrally formed as part of the flue pipe or may be an insert.

Advantageously a baffle plate is disposed along a lowermost portion of the flue pipe thereby shielding a portion of the flue pipe from the flue gases. The baffle may be perforated in order to allow moisture to pass through it. Alternatively, the interface between the baffle and the further flow director may provide apertures to allow moisture to pass from the gas flue pipe into the liquid collector.

According to a second aspect of the present invention there is provided a boiler having a flue according to a first aspect of the present invention.

BRIEF DESCRIPTION OF THE FIGURES

The present invention will further be described, by way of example, with reference to the accompanying drawings, in which.

DESCRIPTION OF PREFERRED EMBODIMENT OF THE INVENTION

Figure 1:
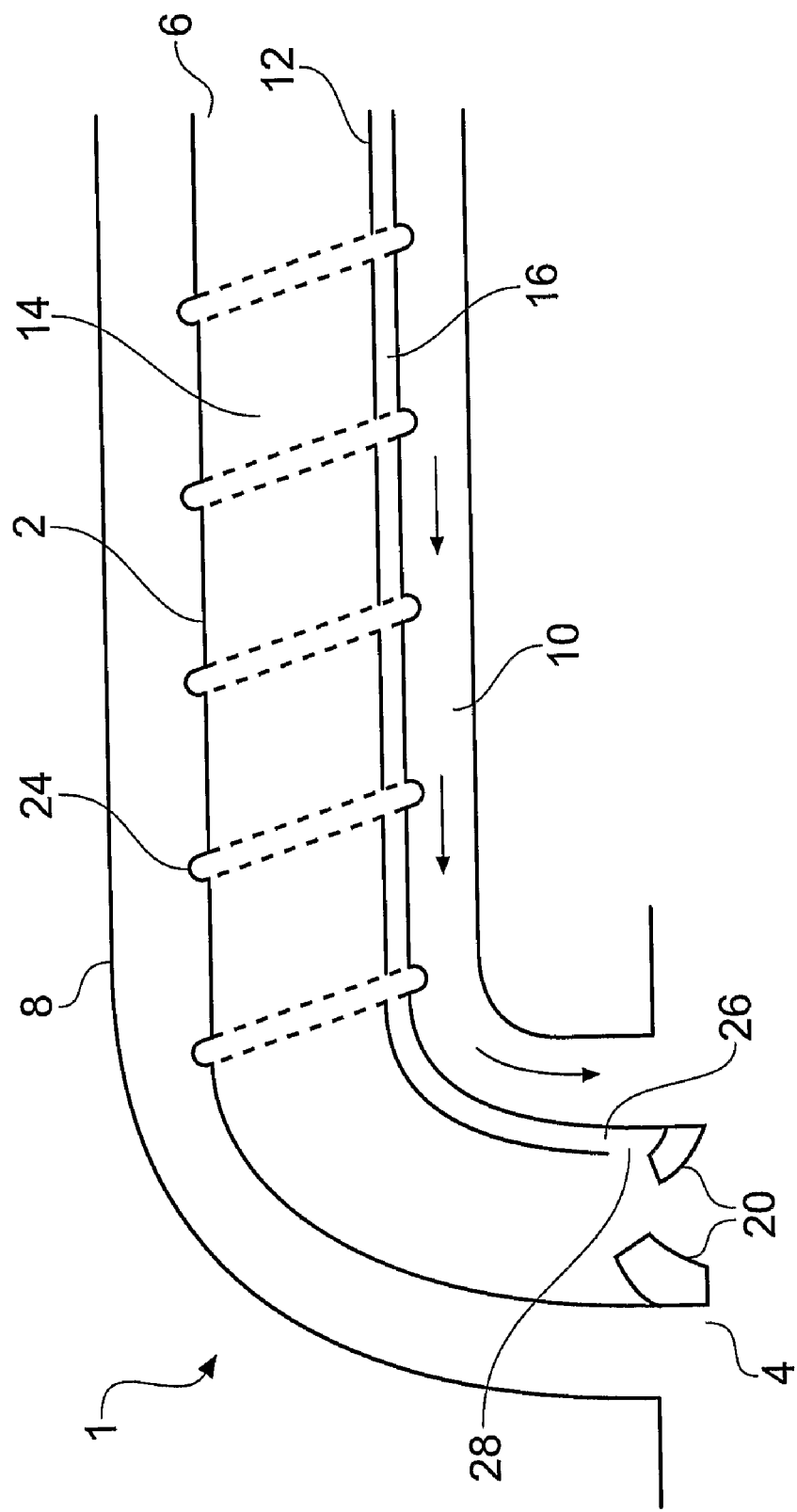
FIG. 1 is a cross section through a flue constituting an embodiment of the present invention.

FIG. 1 schematically shows a cross section through a flue 1 constituting a preferred embodiment of the present invention. A flue pipe 2 has an inlet 4 for receiving combustion products from a boiler and an outlet 6 for exhausting the combustion products to the atmosphere. The fitting of the flue 1 to the boiler combustion and heat exchange region may be one of several well known designs and in itself does not constitute part of the invention. The flue 1 is typically installed in association with a balanced flue domestic boiler and consequently the flue pipe 2 is generally concentrically disposed within an air inlet pipe 8 so as to define a passage 10 through which fresh air can be admitted from the exterior of the flue and flow towards the inlet of the combustion chamber of the boiler. This air flow is encouraged by the provision of a fan within the boiler. As a consequence, cold air is drawn over an exterior surface of the flue pipe 2. Therefore the flue pipe is cooled and moisture carried in the hot flue gas from the boiler condenses on the interior surface of the flue pipe 2. However, the inventor has realised that in conventional flue systems the moisture merely sits on the internal surface of the flue pipe 2 and hence the warm flue gas passing over it has the opportunity to pick up that moisture again either by re-evaporation or due to mere velocity of the gas and to carry it with it to the exit of the flue.

In the present invention a liquid collector is provided. This is formed by an interior baffle 12 which extends along the flue pipe in a lowermost region thereof in order to partition the flue pipe into a gas carrying region 14 and a liquid collection region 16 which is shielded from the gas flow by virtue of the baffle 12 and also by virtue of being closed, apart from a drain hole 28, to the gas inlet 4. The baffle 12 may be integrally formed with the flue pipe or, conveniently, may be an insert.

Water running down the side of the flue pipe 2 may pass around the edges of the baffle 12 or through perforations therein in order to enter the liquid collection region 16 where the liquid is now shielded from the flue gas flow and consequently does not become readmitted into the gas flow.

In order to enhance the formation of droplets within the flue pipe the interior surface of the flue pipe 2 is lined with (or alternatively the pipe may be made from) a material that does not wet. The concept of whether a surface wets or not depends upon the angle between the meniscus of a droplet of water sitting on that surface and the surface itself. If the angle of interception between the meniscus and the surface is greater than 90°, such that the edges of the droplet overhang the footprint of the droplet on the surface then the surface is said not to wet. Polytetrafluroethane represents a material which does not wet and consequently any moisture condensing on that surface quickly coalesces into droplets which run down the surface rather than sticking to it. The droplets run into the liquid collector formed by the region 16 thereby removing the liquid from the gas flow. As a further enhancement several fins 20, for example in the form of petal fins projecting from an interior surface of the flue pipe at the inlet region can be used to impart rotational motion on the gas as it passes through the flue pipe. This rotational motion tends to cause heavier particles within the gas, namely droplets of moisture, to be directed outwardly and onto the interior surface of the flue wall. This further enhances the liquid collecting properties of the flue pipe.

Advantageously further gas flow and liquid guide features are formed within the flue pipe. In the example shown in FIG. 1 a helically extending groove is formed in the flue pipe which defines an area of increased diameter compared to the normal diameter of the flue pipe. This groove, generally designated 24 acts to catch any droplets of moisture which were being blown longitudinally along the wall of the flue pipe with the gas flow, enabling them to drop into the groove and then flow within the groove towards the liquid collector. However other forms of collector could be formed and indeed upstanding (interiorly directed) walls extending from the interior surface of the flue pipe can be used to achieve the same effect. The helical formation of the groove or interior walls acts to maintain the rotational motion of the gas as it passes along the flue.

The collected condensate tends to be acidic in nature and therefore it cannot merely be vented anywhere within the boiler. Boilers are already designed to cope with condensate collecting within the combustion chamber and therefore this feature can be taken advantage of in order to drain the collected condensate from the flue. To this end, the interior baffle 12 extends towards the flue inlet region 4 but closes against and seals with the wall of the flue pipe 2 so as to form a reservoir region 26. One or more drain apertures are formed within the baffle 12 in order to enable the condensate to drain into the combustion region of the boiler when the boiler is not in use. The apertures 28 are deliberately kept small in size so as to guard against any appreciable amount of gas flow occurring within the liquid collector when it is empty. As the collector starts to fill, the liquid flows towards the reservoir region 26 because the flue is installed slightly inclined from the horizontal. The gas pressure from the combustion region is just sufficient to hold the collected liquid within the reservoir whilst the boiler is operating. However, as soon as the combustion process stops and the flow of flue gases slows to a stop, the pressure then becomes insufficient and the collected liquid drains through the aperture 28 into the boiler from where it is collected by a boiler drain and disposed of.

It is thus possible to provide a simple and retrofitable modification to a flue for a boiler so as to reduce the instance of pluming.

Figure 2:
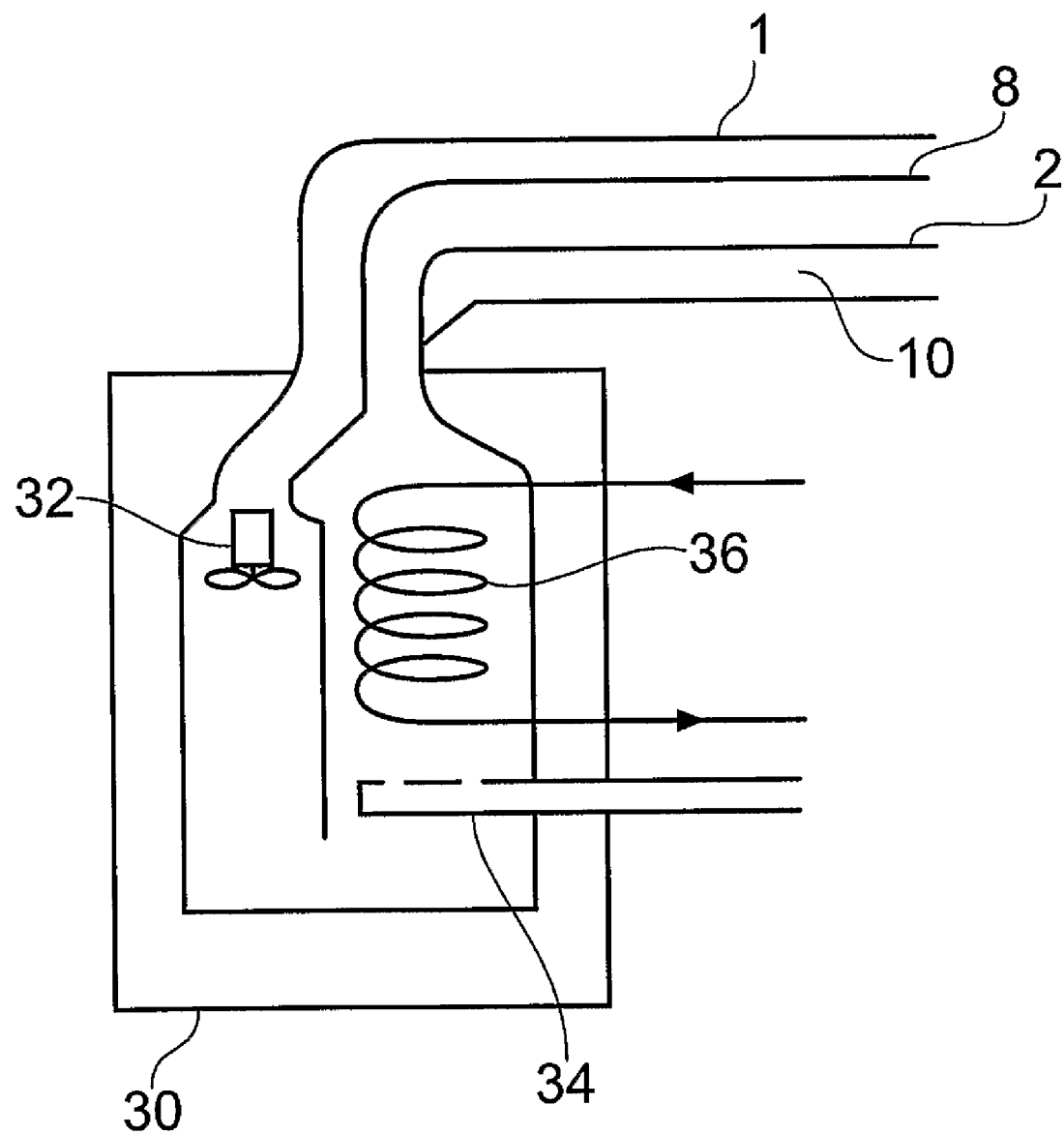
FIG. 2 schematically shows a boiler in combination with the flue.

FIG. 2 schematically illustrates the flue 1 in combination with a boiler 30. As noted hereinbefore the fan 32 acts to draw air through the air inlet passage 10 and then to direct the air over a gas burner 34 where the combustion of gas takes place and the hot gasses flow over a heat exchanger 36 before exiting through the flue pipe 2.

It is thus possible to provide an improved flue which reduces the instance of pluming.

The invention claimed is:

1. A flue, comprising a flue pipe for carrying flue gas, and an elongate liquid collector within the flue pipe and extending along the flue pipe, and adapted to collect condensation from the interior of the flue pipe and to shield the condensation from the flue gas, and a liquid guide disposed within the flue pipe for directing droplets of moisture to flow towards the liquid collector in which the liquid guide is a helical guide that extends along the interior of the flue pipe, and in which the flue pipe is disposed within an air inlet pipe to a boiler such that the exterior of the flue pipe is cooled by air passing over it.

2. A flue as claimed in claim 1, in which the helical guide is a helical depression within an interior wall of the flue.

3. A flue as claimed in claim 1, in which the helical guide is formed by at least one wall located within the flue.

4. A flue as claimed in claim 1, in which the helical guide is integrally formed with the flue pipe.

5. A flue as claimed in claim 1, in which the helical guide is an insert within the flue pipe.

6. A flue as claimed in claim 1, in which the flue pipe is formed of a material or its interior surface is treated with a material that does not wet.

7. A flue as claimed in claim 1, in which the interior of the flue pipe is coated with polytetrafluroethane (PTFE).

8. A flue as claimed in claim 1, in which the liquid collector is a channel formed in a lower surface of the flue pipe.

9. A flue as claimed in claim 1, wherein a divider member extends along the interior of the flue pipe.

10. A flue as claimed in claim 9, in which the divider member partitions the interior of the flue pipe so as to form the liquid collector therein.

11. A flue as claimed in claim 1, wherein the liquid collector opens into the flue gas path in the vicinity of an inlet to the flue.

12. A flue as claimed in claim 11, in which the opening into the flue gas path is profiled such that gas pressure from flue gas passing through the flue urges against the exit of liquid from the liquid collector.

13. A flue as claimed in claim 1, further comprising at least one gas flow director for imparting rotation into the flue gas.

14. A flue as claimed in claim 13, wherein the flow director comprises a plurality of fins adapted to cause the gas passing by the fins to undergo rotational motion.

15. A flue as claimed in claim 13, in which the flow director is located proximal an inlet of the flue.

16. A flue as claimed in claim 1, further comprising a flow director disposed within the flue.

17. A boiler in combination with a flue as claimed in claim 1.

18. A flue, comprising a flue pipe for carrying flue gas, the flue pipe having an elongate divider member extending along the flue pipe to partition the pipe into a gas carrying region and a liquid collection region shielded from the gas flow in the gas carrying region, and wherein apertures are provided in the divider member and/or between the divider member and the flue pipe to allow moisture to enter the elongate collection region.

19. A flue as claimed in claim 18, further comprising a liquid guide disposed within the flue pipe in which the liquid guide is adapted to direct droplets of moisture to flow towards the liquid collection region.

20. A flue as claimed in claim 19, in which the liquid guide is a helical guide that extends along the interior of the flue pipe.

21. A flue as claimed in claim 18, in which the flue pipe is formed of a material or its interior surface is treated with a material that does not wet.

22. A flue as claimed in claim 18, in which the liquid collection region is a channel formed in a lower surface of the flue pipe.

23. A flue as claimed in claim 18, further comprising at least one gas flow director for imparting rotation into the flue gas.

24. A flue as claimed in claim 18, further comprising a further flow director disposed within the flue.

25. A flue as claimed in claim 24, in which the opening into the flue gas path is profiled such that gas pressure from flue gas passing through the flue urges against the exit of liquid from the liquid collector.

26. A boiler in combination with a flue as claimed in claim 18.

27. A flue, comprising a flue pipe for carrying flue gas, and an elongate liquid collector within the flue pipe and extending along the flue pipe, and adapted to collect condensation from the interior of the flue pipe and to shield the condensation from the flue gas, and a liquid guide disposed within the flue pipe for directing droplets of moisture to flow towards the liquid collector in which the liquid guide is a helical guide that extends along the interior of the flue pipe, and in which the helical guide is a helical depression within an interior wall of the flue.

* * * * *